(12) United States Patent
Ishikawa

(10) Patent No.: US 6,650,540 B2
(45) Date of Patent: Nov. 18, 2003

(54) COOLING UNIT HAVING A HEAT-RECEIVING SECTION AND A COOLING FAN, AND ELECTRONIC APPARATUS INCORPORATING THE COOLING UNIT

(75) Inventor: Kenichi Ishikawa, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/234,201

(22) Filed: Sep. 5, 2002

(65) Prior Publication Data

US 2003/0099091 A1 May 29, 2003

(30) Foreign Application Priority Data

Nov. 29, 2001 (JP) ........................................ 2001-364814

(51) Int. Cl.[7] ................................................. H05K 7/20
(52) U.S. Cl. ................. 361/695; 165/80.3; 165/104.33; 165/121; 165/126; 454/184; 361/687; 361/700
(58) Field of Search ........................ 176/15.2; 165/80.2, 165/80.3, 104.33, 104.34, 185, 121, 126; 361/687, 694–695, 697, 700–703; 454/184

(56) References Cited

U.S. PATENT DOCUMENTS 5,731,952 A    3/1998  Ohgami et al.
6,304,441 B1 * 10/2001 Han ............................ 361/687
6,407,921 B1 *  6/2002 Nakamura et al. .......... 361/700
6,442,025 B2 *  8/2002 Nakamura et al. .......... 361/695
6,510,052 B2 *  1/2003 Ishikawa et al. ............ 361/687
6,567,269 B2 *  5/2003 Homer et al. ............... 361/700

OTHER PUBLICATIONS

U.S. patent application No.09/955,091, Ishikawa et al., Filed Sep. 19, 2001.

* cited by examiner

Primary Examiner—Gregory Thompson
(74) Attorney, Agent, or Firm—Finnegan, Henderson, Farabow, Garrett & Dunner, L.L.P.

(57) ABSTRACT

A cooling unit having a heat-receiving section, a heat sink and a cooling fan. The heat-receiving section opposes a printed wiring board across a heat generating component mounted on the board. The section receives heat from the heat generating component. The heat sink is thermally connected to the heat-receiving section. The cooling fan has a fan case. The heat-receiving section and the fan case are arranged, side by side, along the printed wiring board. The fan case protrudes from that side of the printed wiring board which faces away from the heat-receiving section.

18 Claims, 6 Drawing Sheets

COOLING UNIT HAVING A HEAT-RECEIVING SECTION AND A COOLING FAN, AND ELECTRONIC APPARATUS INCORPORATING THE COOLING UNIT

CROSS-REFERENCE TO RELATED APPLICATIONS

This application is based upon and claims the benefit of priority from the prior Japanese Patent Application No. 2001-364814, filed Nov. 29, 2001, the entire contents of which are incorporated herein by reference.

BACKGROUND OF THE INVENTION

1. Field of the Invention

The present invention relates to a cooling unit designed to cool heat generating components such as a CPU (Central Processing Unit) and to an electronic apparatus incorporating the cooling unit. In particular, the invention relates to a structure that enhances the efficiency of cooling heat generating components.

2. Description of the Related Art

CPUs for use in electronic apparatuses such as portable computers generate heat in an increasing amount, as their operating speed increases and the functions they perform increase in number. The electronic apparatus therefore incorporates a cooling unit for cooling the CPU. The cooling unit is provided in the housing of the electronic apparatus. The cooling unit comprises a heat-receiving section, a heat sink, and a cooling fan. The heat-receiving section receives the heat from the CPU. The heat sink is thermally connected to the heat-receiving section. The cooling fan applies cooling air to the heat sink.

The cooling fan comprises a flat fan case and an impeller provided in the fan case. The fan case has a plurality of air inlet ports and an air outlet port. The impeller is designed to draw air through the air inlet ports and drive the air, as cooling air, through the air outlet port. The cooling air forced out via the air outlet port is applied to the heat sink. The heat transmitted from the CPU to the heat sink is thereby released from the heat sink, owing to the heat exchange between the heat sink and the cooling air. The heat radiates from the electronic apparatus as the cooling air flows out of the housing of the electronic apparatus.

The CPU is mounted on a printed wiring board of the electronic apparatus. The printed wiring board is provided in the housing of the apparatus, extending along the bottom wall of the housing. The cooling unit is mounted on the printed wiring board, too, with the heat-receiving section, heat sink and cooling fan arranged side by side on the printed wiring board. The impeller of the cooling fan lies horizontally on the printed wiring board, with its shaft extending in the direction of thickness of the housing of the electronic apparatus. The fan case holding the impeller is thicker than the heat-receiving section and the heat sink. Hence, the thickness of the fan case determines the maximum thickness of the cooling unit.

The printed wiring board and the cooling unit overlap, one above the other, in the direction of thickness of the housing of the electronic apparatus. It follows that the space in the housing must have a height equal to or greater than the sum of the thickness of the wiring board and the thickness of the fan case.

In recent years, however, it is demanded that the electronic apparatus of this type should have as thin and compact a housing as possible. The space within the housing, for accommodating various components, is inevitably limited. Consequently, the fan case of the cooling fan needs to be as thin as possible. As known in the art, the larger the impeller in its axial direction, the greater its air-applying ability of the cooling fan. If the fan case is thin, the impeller cannot be large in its axial direction, reducing the air-applying ability of the cooling fan. Ultimately, the cooling unit cannot cool the heat generating component with high efficiency.

BRIEF SUMMARY OF THE INVENTION

An embodiment of the present invention is to provide a cooling unit which has a large cooling fan without increasing the size of the fan case and which can therefore cool heat generating components with high efficiency.

Another embodiment of the invention is to provide an electronic apparatus that has a cooling unit whose heat-receiving section can be large enough to cool the heat generating component efficiently, without increasing the size of the housing of the electronic apparatus.

To attain these embodiments, a cooling unit according to an aspect of the invention comprises: a heat-receiving section which receives heat from a heat generating component and which opposes a printed wiring board across the heat generating component; a heat sink thermally connected to the heat-receiving section and configured to release heat from the heat generating component; and a cooling fan which applies cooling air to the heat sink. The cooling fan has a fan case and an impeller provided in the fan case. The fan case is arranged side by side with the heat-receiving section along the printed wiring board. The fan case protrudes from that side of the printed wiring board which faces away from the heat-receiving section.

In the cooling unit thus constructed, the fan case can have a sufficient thickness and can therefore accommodate a large impeller. This increases the air-applying ability of the cooling fan. The cooling fan can apply cooling air to the heat sink at a sufficient flow rate. Hence, the cooling unit can cool the heat generating component with high efficiency.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate the embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings that show a portable computer.

Figure 1:
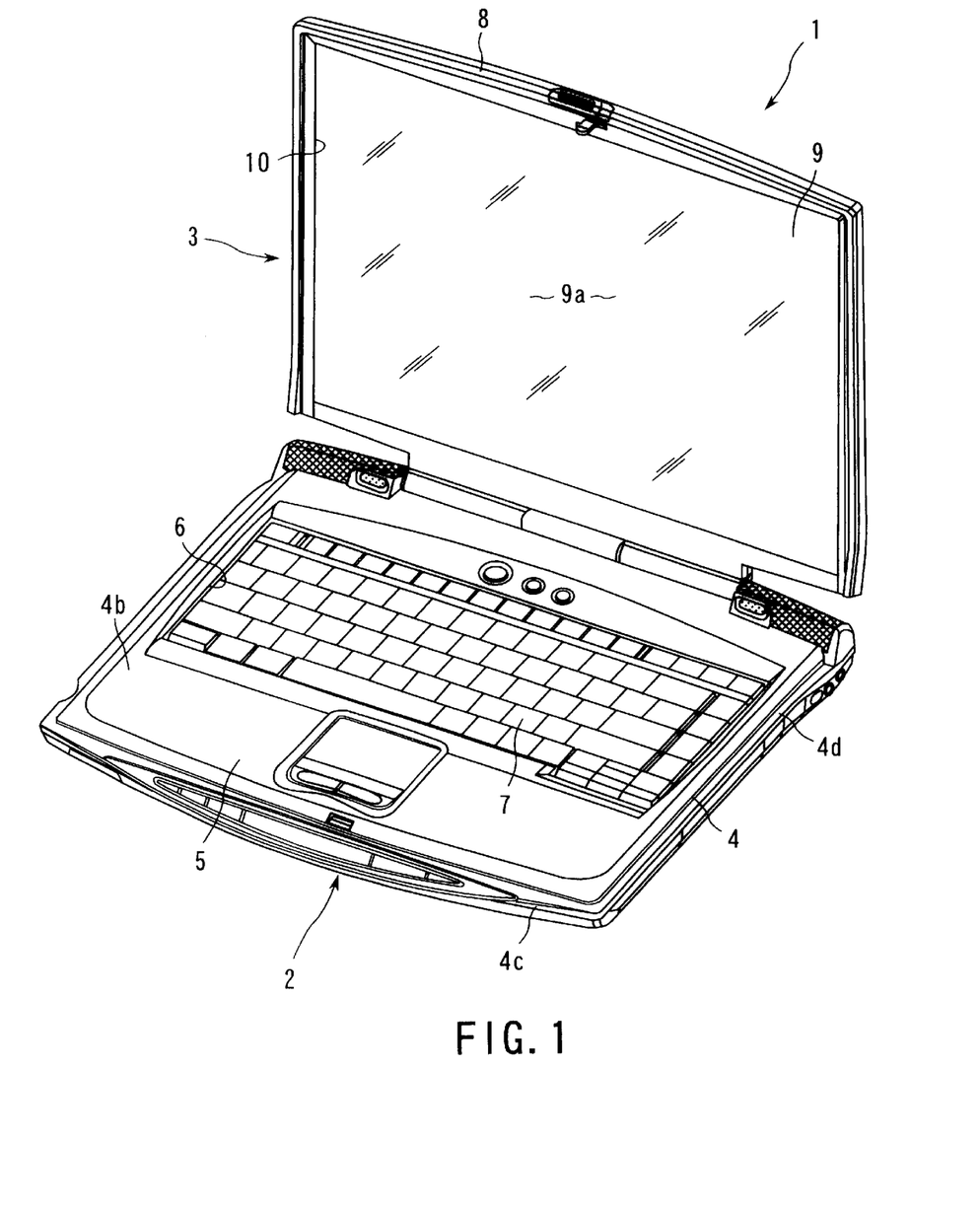
FIG. 1 is a perspective view of a portable computer according to an embodiment of the present invention.

FIG. 1 shows a portable computer 1, or an electronic apparatus to which the invention is applied. The portable computer 1 comprises computer main body 2 and a display unit 3. The computer main body 2 comprises a housing 4. The housing 4 is a flat box composed of a bottom wall 4a, a top wall 4b, a front wall 4c, left and right walls 4d, and a rear wall 4e. The front wall 4c, left and right walls 4d and rear wall 4e stand on the edges of the bottom wall 4a, defining the four sides of the housing 4. The top wall 4b has a palm rest 5 and a keyboard holder 6. The keyboard holder 6 is located at the back of the palm rest 5. The keyboard holder 6 holds a keyboard 7.

Figure 2:
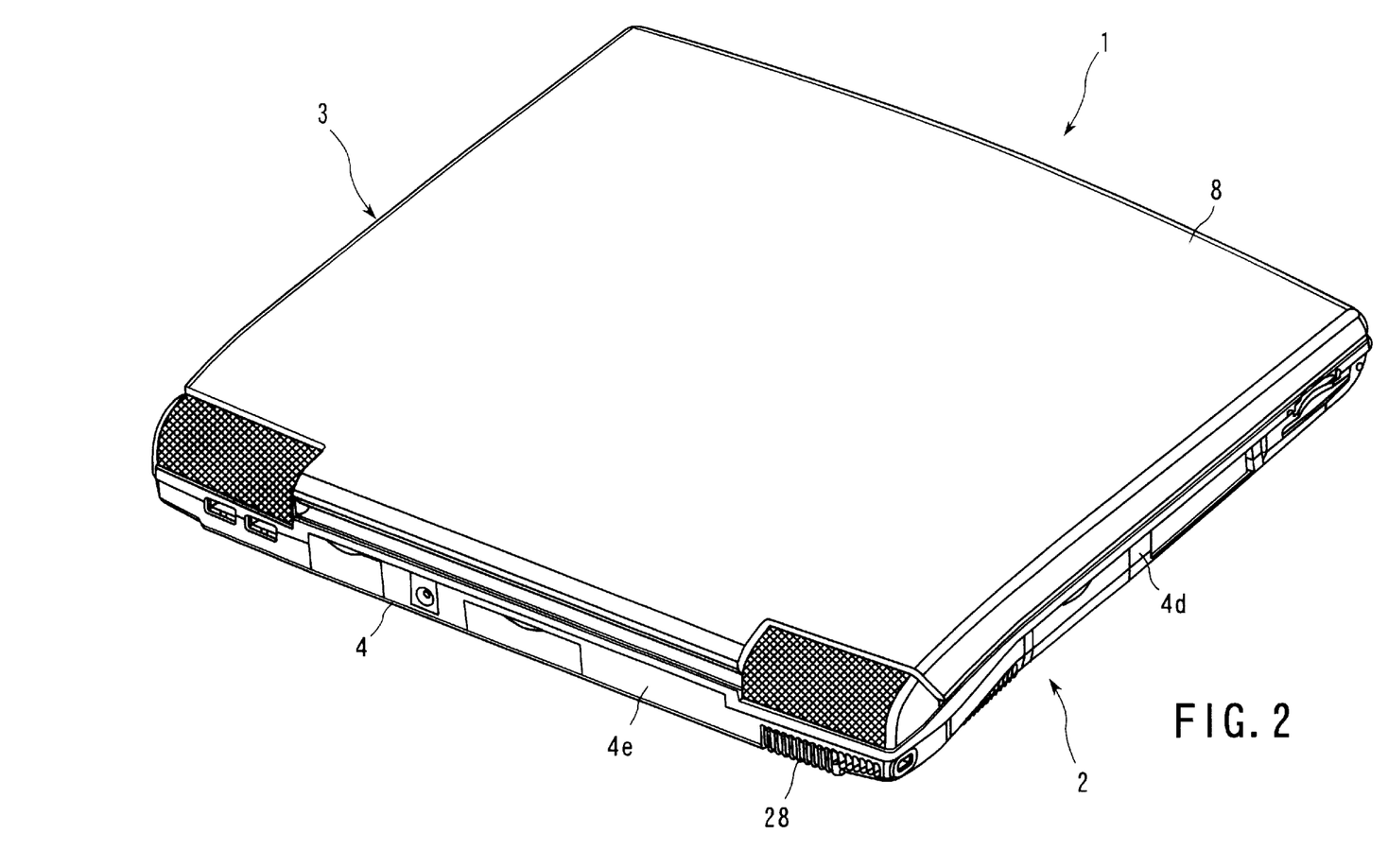
FIG. 2 is a perspective view of the portable computer, specifying the position of the air outlet ports made in the housing of the computer.

The display unit 3 comprises a display housing 8 and a liquid crystal display (LCD) panel 9. The display housing 8 holds the LCD panel 9. The LCD panel 9 has a display screen 9a for displaying images. The display screen 9a is exposed to the outside through the opening 10 made in the front wall of the display housing 8. The display housing 8 is coupled to the rear edge of the housing 4 by hinges (not shown). Therefore, the display unit 3 can be rotated between a closed position and an open position. At the closed position, the display unit 3 lies on the computer main body 2 as shown in FIG. 2, covering the palm rest 5 and keyboard 6 from above. At the open position, the display unit 3 stands up as shown in FIG. 1, exposing the palm rest 5 and keyboard 6 and setting the display screen 9a in an upright position.

Figure 3:
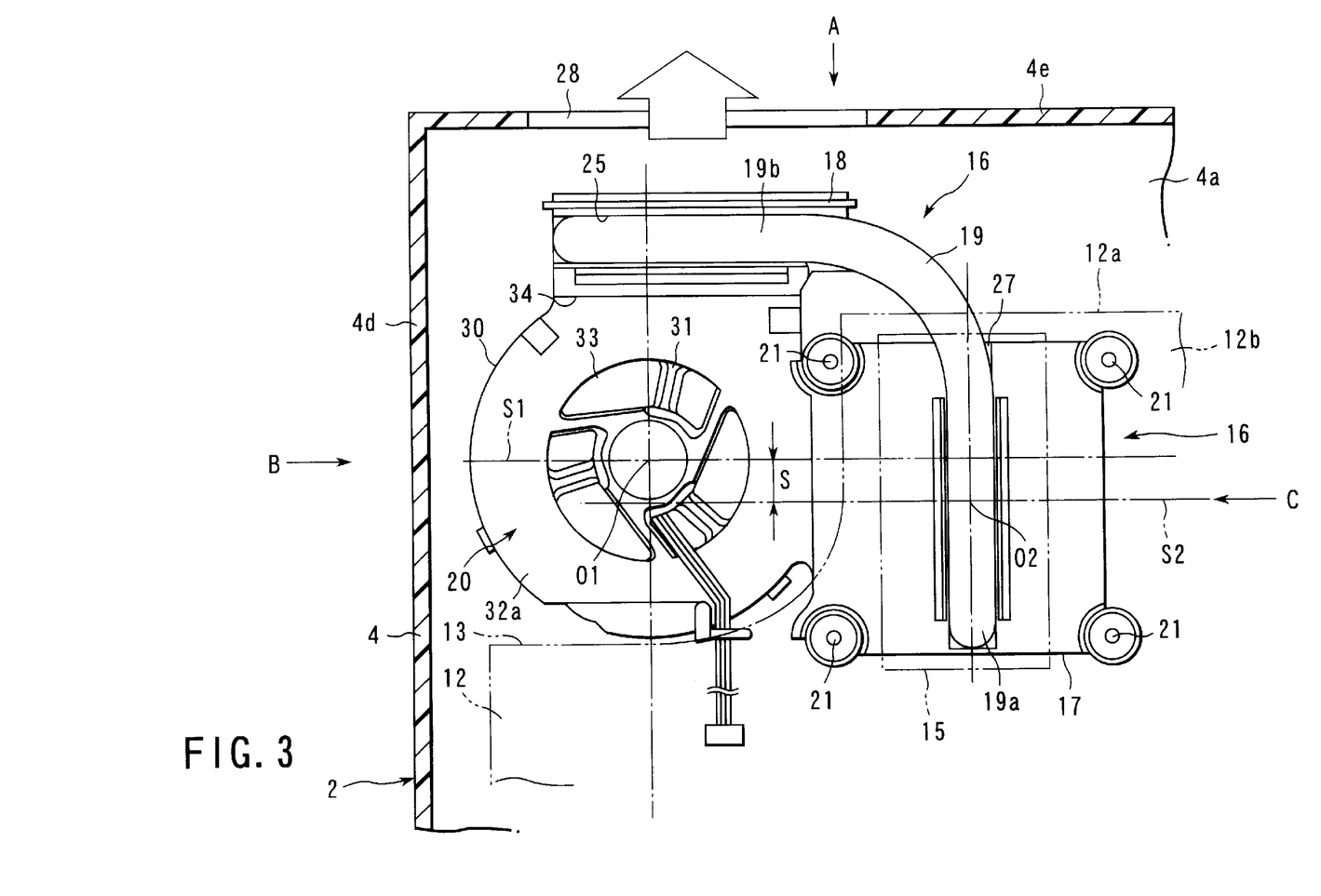
FIG. 3 is a plan view of the portable computer as observed from one side, illustrating the positional relation of the printed wiring board, CPU and cooling unit, all incorporated in the computer.

As FIG. 3 depicts, the housing 4 incorporates a printed wiring board 12. The printed wiring board 12 extends parallel to the bottom wall 4a of the housing 4. The board 12 has its three sides 12a surrounded by the front wall 4c, side wall 4d and rear wall 4e of the housing 4. The board 12 has a cutout 13 at the rear-left corner. In other words, the rear-left corner of the board 12 has been cut away. The cutout 13 is located in the corner defined by the left side wall 4d and the rear wall 4e of the housing 4.

A CPU 15, which is a square chip, is mounted on the upper surface 12b of the printed wiring board 12. The CPU 15 is one of the heat generating components of the portable computer 1. The CPU 15 is arranged on the left-end part of the printed wiring board 12 and located near the cutout 13. The CPU 15 generates much heat while operating. It must be cooled to keep operating in a stable condition.

Figure 4:
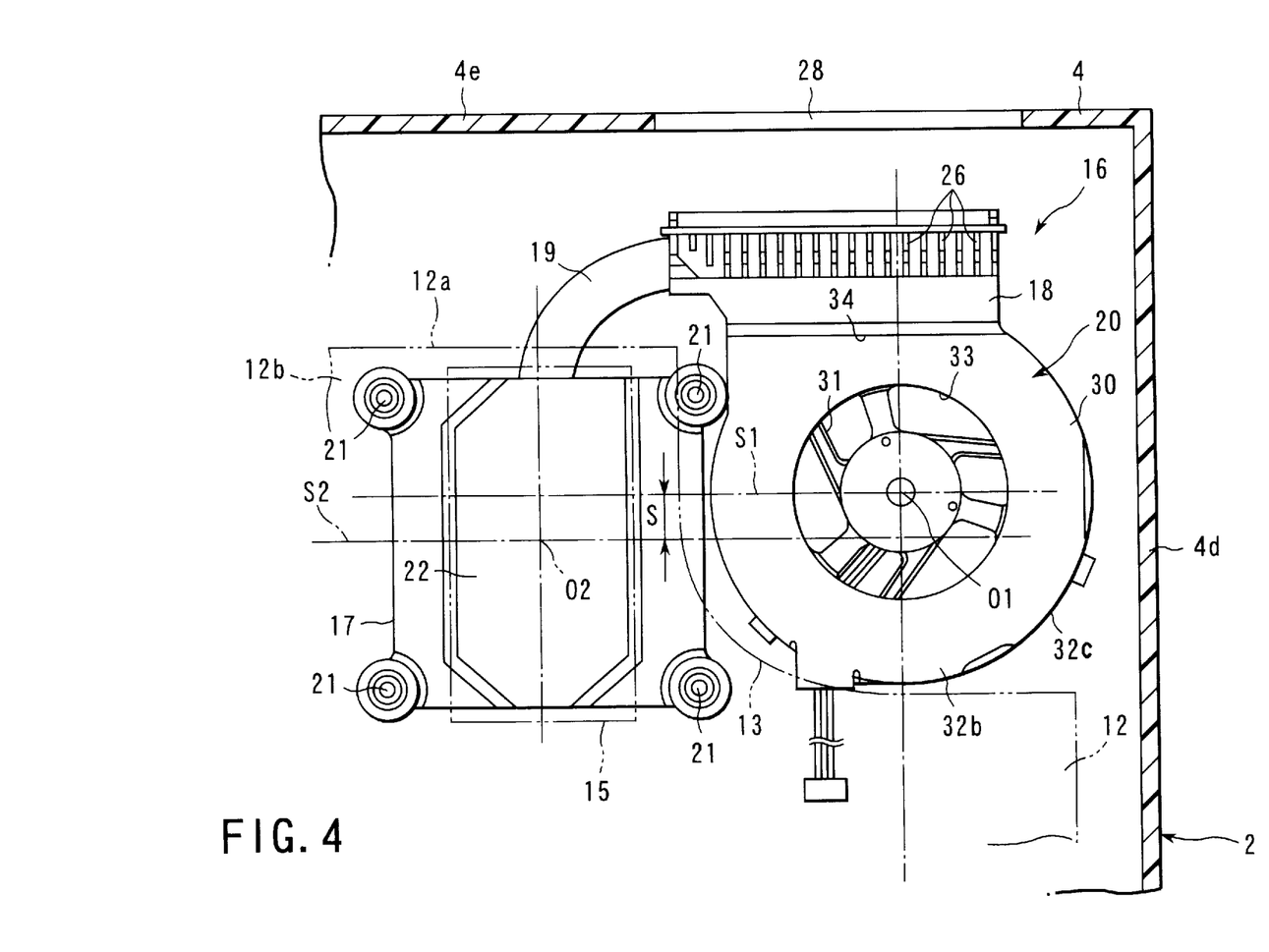
FIG. 4 is a plan view of the portable computer, as looked at from the opposite side, also showing the positional relation of the printed wiring board, CPU and cooling unit.
Figure 5:
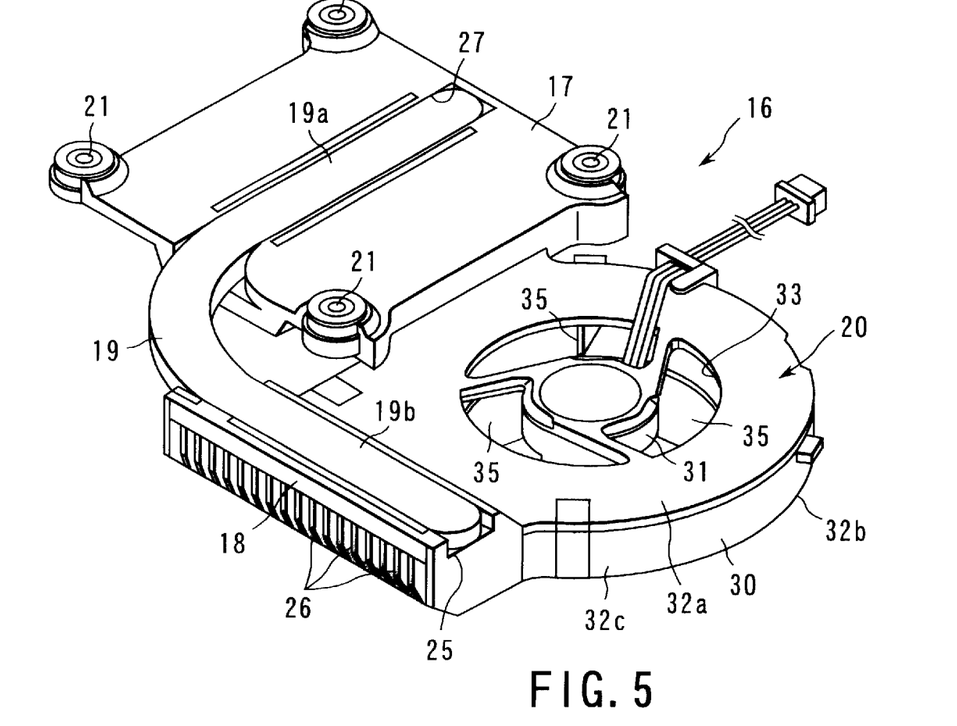
FIG. 5 is a perspective view of the cooling unit.

As FIGS. 3 and 4 illustrate, the housing 4 contains a cooling unit 16 for cooling the CPU 15. The cooling unit 16 is positioned in the corner that is defined by the left wide wall 4d and the rear wall 4e. As shown in FIG. 5, the cooling unit 16 has a heat-receiving section 17, a heat sink 18, a heat pipe 19, and a cooling fan 20.

The heat-receiving section 17 is made of metal such as aluminum alloy, which excels in thermal conductivity. The heat-receiving section 17 is a square plate and covers the entire CPU 15 from above. The section 17 has four bosses 21 at its four corners, respectively. The bosses 21 are secured to the bottom wall 4a of the housing 4 by means of screws. The lower surface of the heat-receiving section 17 is a flat heat-receiving surface 22. The heat-receiving surface 22 opposes the upper surface 12b of the printed wiring board 12 and the CPU 15 mounted on the printed wiring board 12. The CPU 15 is thermally connected to the center part of the heat-receiving surface 22 by the use of thermally conductive grease.

The heat sink 18 is made of metal such as aluminum alloy, which excels in thermal conductivity. The heat sink 18 extends in the widthwise direction of the housing 4. It has a recess 25 in its upper surface and a plurality of heat-radiating fins 26. The heat-radiating fins 26 are arranged, spaced apart at regular intervals in the widthwise direction of the housing 4.

The heat pipe 19 receives the heat generated by the CPU 15 and transmitted to the heat-receiving section 17, and transfers this heat to the heat sink 18. The heat pipe 19 has two end portions 19a and 19b and is bent such that the end portions 19a and 19b extend in two directions that intersect with each other at right angles. The first end portion 19a of the heat pipe 19 is fitted in a groove 27 made in the upper surface of the heart-receiving section 17. The second end portion 19b of the heat pipe 19 is fitted in the recess 25 of the heat sink 18. Hence, the heat pipe 19 couples the heat-receiving section 17 and the heat sink 18 together.

As seen from FIGS. 3 and 4, the first end portion 19a of the heat pipe 19 extends in the direction of depth of the housing 4. This means that the second end portion 19b of the heat pipe 19 extends in the widthwise direction of the housing 4. The second end portion 19b extends into the gap between the side 12a of the printed wiring board 12 and the rear wall 4e of the housing 4. The second end portion 19b is thermally connected to the heat sink 18, which is located between the cutout 13 of the board 12 and an exhaust port 28 made in the rear wall 4e of the housing 4.

Figure 10:
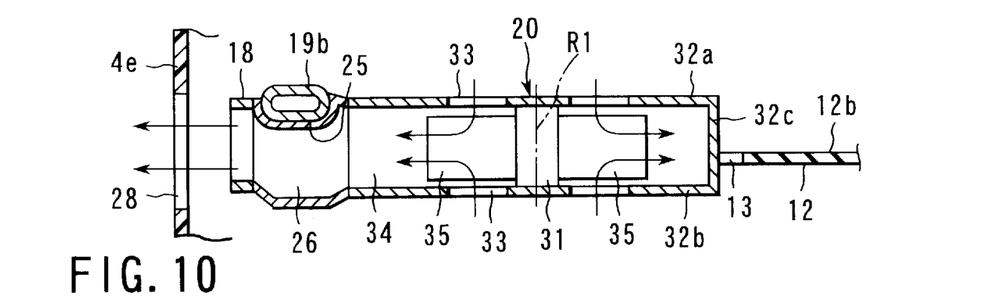
FIG. 10 is a sectional view, illustrating the positional relation of the printed wiring board and the cooling fan.

As FIGS. 5 and 10 show, the cooling fan 20 comprises a fan case 30 and a centrifugal impeller 31. The fan case 30 is made of metal such as aluminum alloy, which excels in thermal conductivity. The fan case 30 is a flat circular box that has a top wall 32a, a bottom wall 32b, and a circumferential wall 32c. It is fastened to the bottom wall 4a of the housing 4 by means of screws.

The top wall 32a and bottom wall 32b of the fan case 30 are spaced apart in the direction of thickness of the housing 4. The top wall 32a and bottom wall 32b have an air inlet port 33 each, at the center part. The circumferential wall 32c connects the top wall 32a and the bottom wall 32b together. The circumferential wall 32c has an air outlet port 34 that has a diameter almost equal to that of the heat sink 18. The air outlet port 34 opens to the exhaust port 28 of the housing 4. The heat sink 18 is fixed to the fan case 30 by means of soldering or the like.

The impeller 31 is housed in the fan case 30 and located between the air inlet ports 33. The impeller 31 has a shaft R1 and a plurality of blades 35 planted on the shaft R1. The shaft R1 extends in the direction of thickness of the housing 4. The blades 35 extend from the circumference of the shaft R1 in the radial direction thereof. Each blade 35 has a height as measured in the axial direction of the shaft R1.

A motor (not shown) drives the impeller 31 when the temperature of the CPU 15 rises above a predetermined threshold. As the impeller 35 is rotated, air in the housing 4 is drawn into the fan case 30 via the air inlet ports 33 and guided to the center of the impeller 31. The air thus drawn is guided from the tips of the blades 35 to the air outlet port 34.

As FIG. 5 illustrates, the fan case 30 is formed integral with the heat-receiving section 17. The fan case 30 and the heat-receiving section 17 are arranged side by side and along the printed wiring board 12, in the widthwise direction of the housing 4. The fan case 30 lies in the cutout 13 of the printed wiring board 12 is spaced from the printed wiring board 12. In other words, the cutout 13 is cut at such a position that the printed wiring board 12 does not contact the fan case 30.

Figure 6:
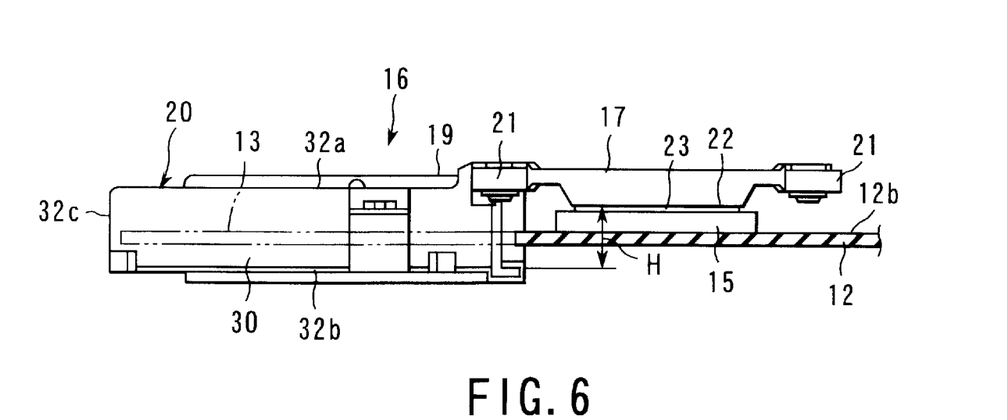
FIG. 6 is a side view representing the positional relation of the CPU and the heat-receiving section.
Figure 7:
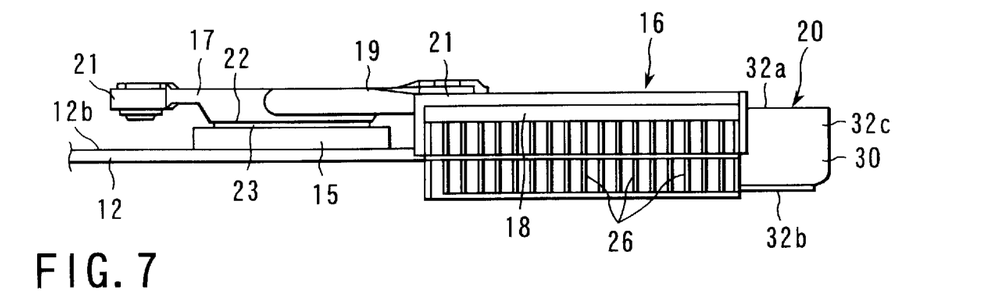
FIG. 7 is a side view of the cooling unit, as viewed in the direction of arrow A shown in FIG. 3.
Figure 8:
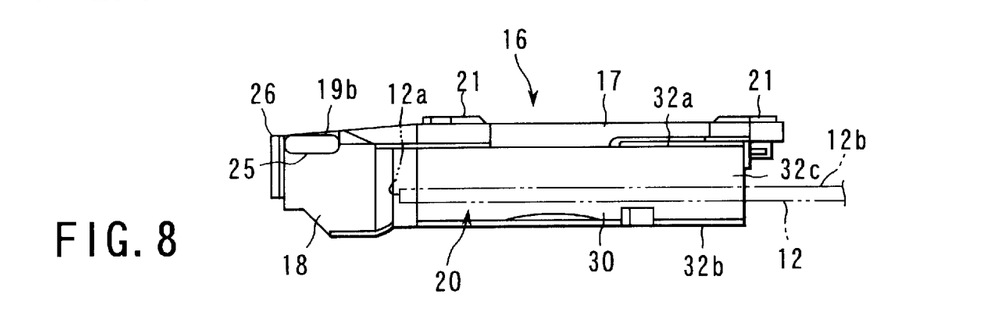
FIG. 8 is a side view of the cooling unit, as looked at in the direction of arrow B shown in FIG. 3.
Figure 9:
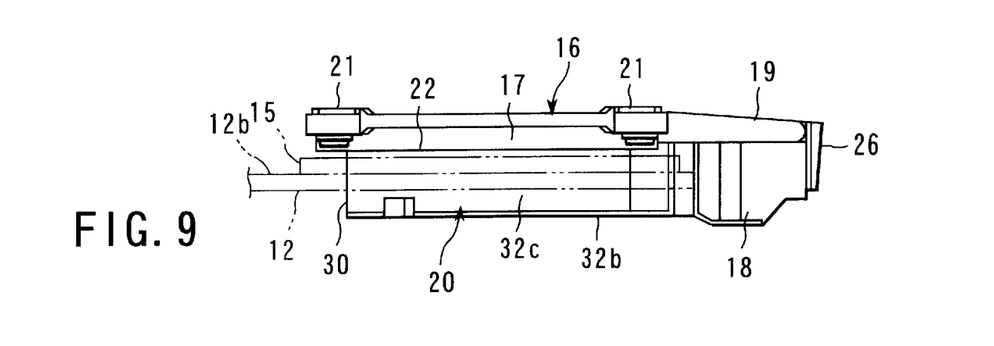
FIG. 9 is a side view of the cooling unit, as observed in the direction of arrow C shown in FIG. 3.

As FIGS. 6 and 7 show, the fan case 30 lies lower than the heat-receiving section 17 with respect to the printed wiring board 12. Therefore, the lower surface 32b of the fan case 30 is positioned lower than the heat-receiving surface 22 and the printed wiring board 12 and opposes the bottom wall 4a of the housing 4. Hence, a step H is provided between the lower surface 32b of the fan case 30 and the heat-receiving surface 22 of the printed wiring board 12. The step H extends in the direction of thickness of the printed wiring board 12. The printed wiring board 12 is accommodated at the step H.

As seen from FIG. 3, line S2 that extends in the widthwise direction of the housing 4, passing the center 02 of the heat-receiving section 17, deviates by distance S from line S1 that extends in the direction of width of the housing 4, passing the center 01 of the impeller 31. That is, the center 02 of the heat-receiving section 17 deviates by distance S from the side 12a of the printed wiring board 12 toward the center of the printed wiring board 12. This means that the heat-receiving section 17 and the cooling fan 20 are displaced with respect to each other by distance S in the direction of depth of the housing 4.

The CPU 15 generates heat while operating in the portable computer 1. The heat is conducted via the heat-receiving section 17 of the cooling unit 16 to the first end portion 19a of the heat pipe 19. The heat thus conducted heats the coolant packed in the heat pipe 19, evaporating the coolant. The resultant vapor flows from the first end portion 19a of the cooling unit 16 to the second end portion 19b thereof. The coolant vapor in the second end portion 19b radiates the heat and is condensed. The heat radiated due to the condensation of the coolant is conducted from the second end portion 19b to the heat sink 18.

The coolant is liquefied through the heat exchange at the second end portion 19b of the heat pipe 19. The coolant liquid is fed back to the first end portion 19a of the heat pipe 19, thanks to capillary force. In the first end portion 19a, the coolant is heated again with the heat emanating from the CPU 15 and vaporized. The coolant is thereby vaporized and condensed over and over again. The heat that the CPU 15 generates is thereby transferred to the heat sink 18.

When the temperature of the CPU 15 rises above a prescribed threshold, the impeller 31 of the cooling fan 20 starts rotating. As the impeller 31 rotates, air is drawn from the housing 4 to the center of the impeller 31 through the air inlet ports 33 of the fan case 30. The air is applied, as cooling air, from the air outlet port 34 of the fan case 30 to the heat sink 18. The cooling air passes through among the heat-radiating fins 26, positively cooling the heat sink 18. The heat conducted from the CPU 15 to the heat sink 18 is released, owing to the heat exchange between the heat sink 18 and the cooling air. The cooling air is heated through this heat exchange and exhausted from the housing 4 through the exhaust port 28.

As indicated above, the fan case 30 of the cooling fan 20 is set in the cutout 13 of the printed wiring board 12 and is spaced away from the printed wiring board 12. The lower surface 32b of the fan case 30 lies lower than the lower surface of the printed wiring board 12. The printed wiring board 12 is located at step H between the lower surface 32b and the heat-receiving surface 22 of the heat-receiving section 17. Thus, the fan case 30 is positioned, as if penetrating the printed wiring board 12. Since the printed wiring board 12 is less thick than the height of step H, both the printed wiring board 12 and the CPU 15 lie within the thickness of the fan case 30.

As a result, the fan case 30 does not protrude upwards or downwards from the printed wiring board 12 so much as in the conventional cooling unit. Therefore, the fan case 30 can be thicker than in the conventional cooling unit, provided that the housing 4 has the same thickness as in the conventional portable computer. Thus, the blades 35 of the impeller 31 can be larger to enhance the air-applying ability of the cooling fan 20. It follows that the cooling air can be applied to the heat sink 18 at a higher flow rate, thereby to cool the CPU 15 with a higher efficiency.

As specified earlier, line S2 passing the center 02 of the heat-receiving section 17 deviates by distance S from line S1 passing the center 01 of the impeller 31, from the side 12a of the printed wiring board 12 toward the center thereof. Thanks to distance S between lines S1 and S2, the heat-receiving surface 22 of the heat-receiving section 17 can be increased to some extent if the CPU 15 is replaced by a bigger and more powerful one.

Even if the heat-receiving section 17 increases in size, it would not protrude much from the rear edge of the printed wiring board 12. This prevents mutual interference of the housing 4 and the heat-receiving section 17. Hence, the CPU 15 can be cooled with a sufficiently high efficiency, without increasing the size of the housing 4.

The present invention is not limited to the embodiment described above. For example, the heat generating component may not be a CPU. Rather, it may be any other circuit component mounted on the printed wiring board.

Moreover, the electronic apparatus is not limited to a portable computer. It may be, for example, a data terminal such as a PDA (Personal Digital Assistant).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cooling unit for cooling a heat generating component mounted on a printed wiring board, said unit comprising:

a heat-receiving section which receives heat from the heat generating component and which opposes the printed wiring board across the heat generating component;

a heat sink thermally connected to the heat-receiving section and configured to release heat from the heat generating component; and a cooling fan which applies cooling air to the heat sink, said cooling fan having a fan case and an impeller provided in the fan case, said fan case arranged side by side with the heat-receiving section along the printed wiring board and protruding from that side of the printed wiring board which faces away from the heat-receiving section.

2. A cooling unit according to claim 1, further comprising a heat pipe which receives heat from the heat generating component and transfers the heat to the heat sink.

3. A cooling unit according to claim 1, wherein the heat-receiving section has a heat-receiving surface thermally connected to the heat generating component, the fan case has two ends having an air inlet port each and spaced apart from each other in the direction of thickness of the printed wiring board, and a step is defined between one of the ends of the fan case and the heat-receiving surface, said step extending in the direction of thickness of the printed wiring board.

4. A cooling unit according to claim 3, wherein the printed wiring board has a cutout in which the fan case lies and is spaced apart from the printed wiring board.

5. A cooling unit according to claim 3, wherein the fan case has a circumferential wall connecting the ends and having an air outlet port, and the cooling air is applied from the fan case to the heat sink via the air outlet port.

6. A cooling unit according to claim 3, wherein the fan case is formed integral with the heat-receiving section.

7. A cooling unit according to claim 5, wherein the heat sink is secured to the fan case and located at the air outlet port.

8. A cooling unit according to claim 1, wherein the printed wiring board has a side, and a line passing the center of the heat-receiving section and extending in a direction in which the cooling fan and the heat-receiving section are arranged deviates from a line passing the center of the impeller of the cooling fan and extending in the direction in which the cooling fan and the heat-receiving section are arranged, and from the side of the printed wiring board toward the center thereof.

9. A cooling unit for cooling a heat generating component mounted on a printed wiring board having a side, said unit comprising:
    a heat-receiving section which receives heat from the heat generating component and which opposes the printed wiring board across the heat generating component;
    a heat sink thermally connected to the heat-receiving section and configured to release heat from the heat generating component; and
    a cooling fan which applies cooling air to the heat sink, said cooling fan having a fan case and an impeller provided in the fan case, said fan case arranged side by side with the heat-receiving section along the printed wiring board in such a way that a line passing the center of the heat-receiving section and extending in a direction in which the cooling fan and the heat-receiving section are arranged deviates from a line passing the center of the impeller of the cooling fan and extending in the direction in which the cooling fan and the heat-receiving section are arranged, and from the side of the printed wiring board toward the center thereof.

10. A cooling unit according to claim 9, further comprising a heat pipe which receives heat from the heat generating component and transfers the heat to the heat sink.

11. A cooling unit according to claim 10, wherein the fan case has two air inlet ports which oppose each other across the impeller, and an air outlet port which guides the cooling air out, and the heat sink is secured to the fan case and located at the air outlet port.

12. A cooling unit according to claim 9, wherein the printed wiring board has a cutout in which the fan case lies and is spaced apart from the printed wiring board and which opens at the side of the printed wiring board.

13. An electronic apparatus comprising:
    a housing;
    a printed wiring board provided in the housing;
    a heat generating component mounted on the printed wiring board; and
    a cooling unit provided in the housing and configured to cool the heat generating component, said cooling unit comprising:
        a heat-receiving section which receives heat from the heat generating component and which opposes the printed wiring board across the heat generating component;
        a heat sink thermally connected to the heat-receiving section and configured to release heat from the heat generating component; and
        a cooling fan which applies cooling air to the heat sink, said cooling fan having a fan case and an impeller provided in the fan case, said fan case arranged side by side with the heat-receiving section along the printed wiring board and protruding from that side of the printed wiring board which faces away from the heat-receiving section.

14. An electronic apparatus according to claim 13, wherein the impeller has a shaft which extends in the direction of thickness of the housing.

15. An electronic apparatus according to claim 14, wherein the heat-receiving section has a heat-receiving surface thermally connected to the heat generating component, the fan case has two ends having an air inlet port each and spaced apart from each other in the direction of thickness of the printed wiring board, and a step is defined between one of the ends of the fan case and the heat-receiving surface, said step extending in the direction of thickness of the printed wiring board.

16. An electronic apparatus according to claim 15, wherein the printed wiring board has a cutout in which the fan case lies and is spaced apart from the printed wiring board.

17. An electronic apparatus comprising:
    a housing;
    a printed wiring board provided in the housing and having a side;
    a heat generating component mounted on the printed wiring board; and
    a cooling unit provided in the housing and configured to cool the heat generating component, said unit comprising:
        a heat-receiving section which receives heat from the heat generating component and which opposes the printed wiring board across the heat generating component;

a heat sink thermally connected to the heat-receiving section and configured to release heat from the heat generating component; and a cooling fan which applies cooling air to the heat sink, said cooling fan having a fan case and an impeller provided in the fan case, said fan case arranged side by side with the heat-receiving section along the printed wiring board, in such a way that a line passing the center of the heat-receiving section and extending in a direction in which the cooling fan and the heat-receiving section are arranged deviates from a line passing the center of the impeller of the cooling fan and extending in the direction in which the cooling fan and the heat-receiving section are arranged, and from the side of the printed wiring board toward the center thereof.

18. An electronic apparatus according to claim 17, wherein the housing has a bottom wall supporting the printed wiring board and the cooling unit, and a plurality of side walls which surround the printed wiring board.

* * * * *